Figure 1:
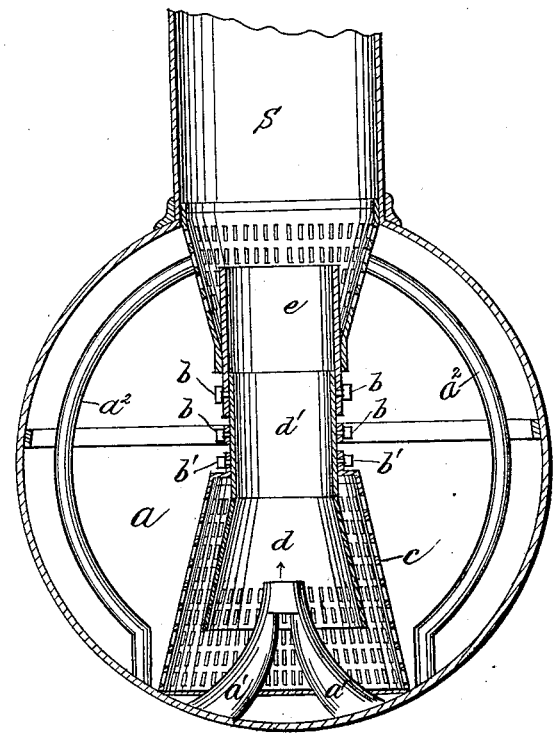

(No Model.)

M. ZECK.
SPARK ARRESTER.

No. 247,145. Patented Sept. 13, 1881.

Witnesses:
H. G. Wadlin.
W. Climo.

Inventor:
M. Zeck
by Might & Brown
Attys

UNITED STATES PATENT OFFICE.

MICHAEL ZECK, OF PITTSBURG, PENNSYLVANIA, ASSIGNOR TO THE ZECK SPARK ARRESTER COMPANY, OF BOSTON, MASSACHUSETTS.

SPARK-ARRESTER.

SPECIFICATION forming part of Letters Patent No. 247,145, dated September 13, 1881.

Application filed January 27, 1881. (No model.)

*To all whom it may concern:*

Be it known that I, MICHAEL ZECK, of Pittsburg, in the county of Allegheny and State of Pennsylvania, have invented certain Improvements in Spark-Arresters, of which the following is a specification.

My present invention relates to spark-arresters and smoke-consumers for locomotive-engines of the class shown and described in Letters Patent of the United States No. 223,427, issued to me January 6, 1880; and my invention consists in improvements upon the form of spark-arrester therein set forth and claimed, whereby the same is rendered simpler in construction and more perfect in its operation; and these improvements I will now proceed to specifically describe, reference being had to the accompanying drawings, forming part of this specification, in which—

Figure 1 represents a vertical section of the smoke-box of a locomotive-engine provided with a spark-arrester embodying my invention.

The smoke-chamber $a$ is constructed after the usual plan, having steam-discharge pipes $a'$ entering the same at the bottom, so formed as to concentrate the jet of steam when discharged into the smoke-chamber. The steam-pipes $a^2$, leading from the boiler to the cylinders, are constructed and arranged in the usual manner.

In the form of my invention secured to me by Letters Patent No. 223,427 I placed over the steam-discharge pipes $a'$ a basket-work or perforated cylinder, and around and outside this cylinder a conical hood, extending down about half the length of the cylinder, for the purpose of regulating the draft and for preventing the egress of the cinder until sufficiently pulverized to pass through the perforations into the smoke-stack. In this form of my invention there are two disadvantages: First, the basket-work or perforated cylinder being placed within the hood regulating the draft, it is necessarily somewhat contracted in size, and presents less perforated surface for the passage of cinder than would otherwise be the case; second, the hood regulating the draft being outside, its requisite adjustment is sometimes prevented by contact with the steam-pipes $a^2$, and as it is necessarily considerably enlarged at the bottom, the draft cannot be so perfectly regulated as is desirable.

In carrying out my present invention I place the hood or lift-pipe $d$ within the basket-work cylinder $c$, instead of upon the outside thereof. The hood $d$ is in form a truncated hollow cone, and is rigidly attached to a sleeve, $d'$, adjustable vertically within the cylinder $e$, which cylinder extends upwardly into the smoke-pipe $s$. The adjustment of the sleeve $d'$, and consequently of the hood or lift-pipe $d$ within the cylinder $e$, is regulated by means of the bolts $b\ b\ b\ b$, or by any other device. Outside and around the hood $d$, I place the cylinder $c$, also in form like a truncated cone, and composed of vertical wire rods, basket-work, or, as shown in this case, of perforated metal. This cylinder $c$ extends nearly or quite to the bottom of the smoke-chamber $a$, and at the top encircles the sleeve $d'$, being adjusted and secured upon said sleeve by means of bolts $b'$. The lower part of the smoke-pipe $s$ is formed of perforated metal-work, and is contracted at the bottom, so as to fit closely to the cylinder $e$.

The operation of my invention, so far as relates to the combustion of smoke and the pulverizing of cinder, is essentially the same as described in Letters Patent No. 223,427, previously referred to; but the disadvantages attending the form of my invention shown in said patent are overcome by the improved form herein described, inasmuch as, the hood or lift-pipe $d$ being now placed within the basket-work cylinder, the draft can be closely regulated, the hood being adjustable to any required extent over the steam-exhaust pipes $a'\ a'$ without interfering with the steam-pipes $a^2\ a^2$, and the hood being contracted in size, it operates much more perfectly in regulating the draft than if made in the form described in my previous patent, No. 223,427, as the smaller this lift-pipe or hood is made the stronger will be the draft.

The basket-work cylinder $c$ also, when placed upon the outside of the hood $d$, as above described, may be considerably increased in size over the form previously shown, and the area of perforated surface being thus increased, the perforations are much less likely to become clogged.

Besides these great advantages secured by my present improvements, the form of my invention herein set forth is much simpler in construction than that shown in my Letters Patent No. 223,427, and the adjustable parts are more accessible and more easily operated. At the same time all the advantages claimed in my Letters Patent No. 223,427 are retained.

If desired, the lift-pipe $d$ may be made imperforate instead of perforate, as shown in this instance.

Having thus described my invention, I claim—

In a spark-arrester, the combination, with the exhaust-jet, of a contracted hood or lift-pipe, $d$, rigidly connected to the sleeve $d'$, said sleeve fitting in a cylinder, $e$, and adapted to be adjusted vertically therein, and the flaring perforated cylinder $c$, adjustable vertically on the sleeve $d'$, whereby the lift-pipe and the flaring outer cylinder can be separately adjusted, all constructed and arranged substantially as shown and described.

In testimony whereof I have signed my name to this specification, in the presence of two subscribing witnesses, this 20th day of January, A. D. 1881.

MICHAEL ZECK.

Witnesses:
H. G. WADLIN,
W. CLIMO.